(12) United States Patent
Glatfelter et al.

(10) Patent No.: US 10,592,853 B2
(45) Date of Patent: Mar. 17, 2020

(54) MANUFACTURING MATERIEL SUPPLY CHAIN DISRUPTION MANAGEMENT SYSTEM

(71) Applicant: The Boeing Company, Chicago, IL (US)

(72) Inventors: John W. Glatfelter, West Chester, PA (US); Brian Dale Laughlin, Oklahoma City, OK (US)

(73) Assignee: The Boeing Company, Chicago, IL (US)

( * ) Notice: Subject to any disclaimer, the term of this patent is extended or adjusted under 35 U.S.C. 154(b) by 617 days.

(21) Appl. No.: 15/099,585

(22) Filed: Apr. 14, 2016

(65) Prior Publication Data

US 2017/0300852 A1    Oct. 19, 2017

(51) Int. Cl.
*G06Q 10/08* (2012.01)
*G06Q 10/06* (2012.01)
(Continued)

(52) U.S. Cl.
CPC ....... *G06Q 10/087* (2013.01); *G05B 19/4155* (2013.01); *G06Q 10/06312* (2013.01);
(Continued)

(58) Field of Classification Search
CPC .......... G06Q 10/087; G06Q 10/06312; G06Q 50/04; G05B 19/4155
(Continued)

(56) References Cited

U.S. PATENT DOCUMENTS 5,216,593 A * 6/1993 Dietrich ................. G06Q 10/06
345/467
6,744,436 B1 * 6/2004 Chirieleison, Jr. .. G06Q 10/087
345/419
(Continued)

FOREIGN PATENT DOCUMENTS

JP          2000090162 A    3/2000
WO       WO2012092649 A1   7/2012

OTHER PUBLICATIONS

Laughlin et al, "Communication System, Method and Computer Program Product for Transferring an Electronic File," U.S. Appl. No. 14/99/476, filed Jan. 8, 2016, 37 pages.
(Continued)

*Primary Examiner* — Vanel Frenel
(74) *Attorney, Agent, or Firm* — Yee & Associates, P.C.

(57) ABSTRACT

A manufacturing materiel management system. The system includes a product inventory monitor including at least one processor having a memory and a communications link, and at least one of a minimum-maximum item matrix and an item supplier dependency matrix. The system includes a manufacturing line item sensor network coupled to the product inventory monitor and configured to monitor in real-time inventory levels of a plurality of components, sub-assemblies, and assemblies in the product inventory used for a manufacturing line for manufacturing an object. The system includes a disruption pattern detector in communication with the manufacturing line item sensor network, and configured to detect normal and abnormal inventory turns, and to generate therefrom normal and disruption patterns. The system includes a resource allocator configured to monitor the normal and disruption patterns and to allocate resources to different projects when a disrupted pattern occurs.

20 Claims, 7 Drawing Sheets

(51) Int. Cl.
*G06Q 50/04* (2012.01)
*G05B 19/4155* (2006.01)

(52) U.S. Cl.
CPC ... *G06Q 50/04* (2013.01); *G05B 2219/32033* (2013.01); *Y02P 90/30* (2015.11)

(58) Field of Classification Search
USPC ............. 705/28, 29, 205, 300, 7.14, 7.28; 700/100; 701/32.9, 183
See application file for complete search history.

(56) References Cited

U.S. PATENT DOCUMENTS

| | | | |
|---|---|---|---|
| 7,769,643 B2 | 8/2010 | Laughlin et al. | |
| 8,700,499 B2 | 4/2014 | Laughlin et al. | |
| 2008/0126171 A1* | 5/2008 | Baldwin | G06Q 10/06 705/7.14 |
| 2011/0029584 A1 | 2/2011 | Laughlin et al. | |
| 2012/0036049 A1* | 2/2012 | Gerzymisch | G06F 8/61 705/29 |
| 2013/0211870 A1* | 8/2013 | Lawson | G06Q 10/06315 705/7.25 |
| 2016/0048788 A1* | 2/2016 | Martin | G06Q 10/06315 705/7.25 |

OTHER PUBLICATIONS

Extended European Search Report, dated Jun. 12, 2017, regarding Application No. 17166433.7, 7 pages.
European Patent Office Examination Report, dated Sep. 19, 2018, regarding Application No. 17166433.7, 4 pages.

* cited by examiner

MANUFACTURING MATERIEL SUPPLY CHAIN DISRUPTION MANAGEMENT SYSTEM

BACKGROUND INFORMATION

1. Field

The present disclosure relates to a learning disruption event handler. More particular, the present disclosure relates to a method of manufacturing including adjusting resources in response to a major disruption event to a manufacturing endeavor.

2. Background

Current inventory management systems do not take into account relationships of inventory dependencies and cascading challenges that occur when disruption events happen. For example, for an aircraft manufacturer, when a fuselage being transported to a manufacturing facility is damaged by a third party, the disruptive effect ripples through the entire business enterprise. Examples of such disruption effects include, but are not limited to, idling of personnel assigned to work on that fuselage, disruption of the production schedule of other aircraft, disruption of the overall manufacturing line, incorrect physical location of parts as other fuselages made for different customers are advanced in the manufacturing line, disruption of other non-aircraft aspects of the business as a result of disruption of the manufacturing time table for the aircraft, inventory levels of some parts may be excessive while inventory levels of other parts may be starved. Usually, many other major disruptions to the enterprise occur as a result of a loss of a single major assembly, such as the example fuselage. Other vendors may also be disrupted, resulting in cascading dependent inventory management issues.

SUMMARY

The illustrative embodiments provide for a manufacturing materiel management system. The system includes a product inventory monitor including at least one processor having a memory and a communications link, and at least one of a minimum-maximum item matrix and an item supplier dependency matrix. The system includes a manufacturing line item sensor network coupled to the product inventory monitor and configured to monitor in real-time inventory levels of a plurality of components, sub-assemblies, and assemblies in the product inventory used for a manufacturing line for manufacturing an object. The system includes a disruption pattern detector in communication with the manufacturing line item sensor network, and configured to detect normal and abnormal inventory turns, and to generate therefrom normal and disruption patterns. The system includes a resource allocator in communication with the product inventory monitor, the manufacturing line item sensor network, and the disruption pattern detector, and configured to monitor the normal and disruption patterns and to allocate resources to different projects when a disrupted pattern occurs.

The illustrative embodiments also provide for a manufacturing materiel management system. The manufacturing materiel management system includes a manufacturing assembly line, including equipment usable to manufacture an object comprising a plurality of parts, including a part. The manufacturing materiel management system also includes a computer comprising a processor, an input device, and a non-transitory computer readable medium in communication with the processor, the non-transitory computer readable medium storing computer usable program code executable by the processor to perform functions. These functions include to monitor the input device for input that indicates a disruption event defined as an event in which manufacture of the object is disrupted as a result of loss of a resource or the part. These functions also include to, responsive to receiving the input, calculate another project which may continue. These functions also include to, responsive to receiving the input, calculate remaining resources which may be allocated to the another project. These functions also include to generate a resource re-allocation plan which defines how remaining resources are to be re-allocated to the another project. The manufacturing materiel management system also includes a communication system in communication with the computer and configured to communicate the re-allocation plan to a manager of the manufacturing assembly line.

The illustrative embodiments also provide for a method of manufacturing. The method includes operating a manufacturing assembly line, including using equipment to manufacture an object comprising a plurality of parts, including a part. The method also includes monitoring, by a computer, an input device in communication with the computer for input that indicates a disruption event defined as an event in which manufacture of the object is disrupted as a result of loss of a resource or the part. The method also includes responsive to receiving the input, calculating, by the computer, another project which may continue. The method also includes, responsive to receiving the input, calculating, by the computer, remaining resources which may be allocated to the another project. The method also includes generating, by the computer, a resource re-allocation plan which defines how remaining resources are to be re-allocated to the another project. The method also includes communicating, using a communication system connected to the computer, the re-allocation plan to a manager of the manufacturing assembly line.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
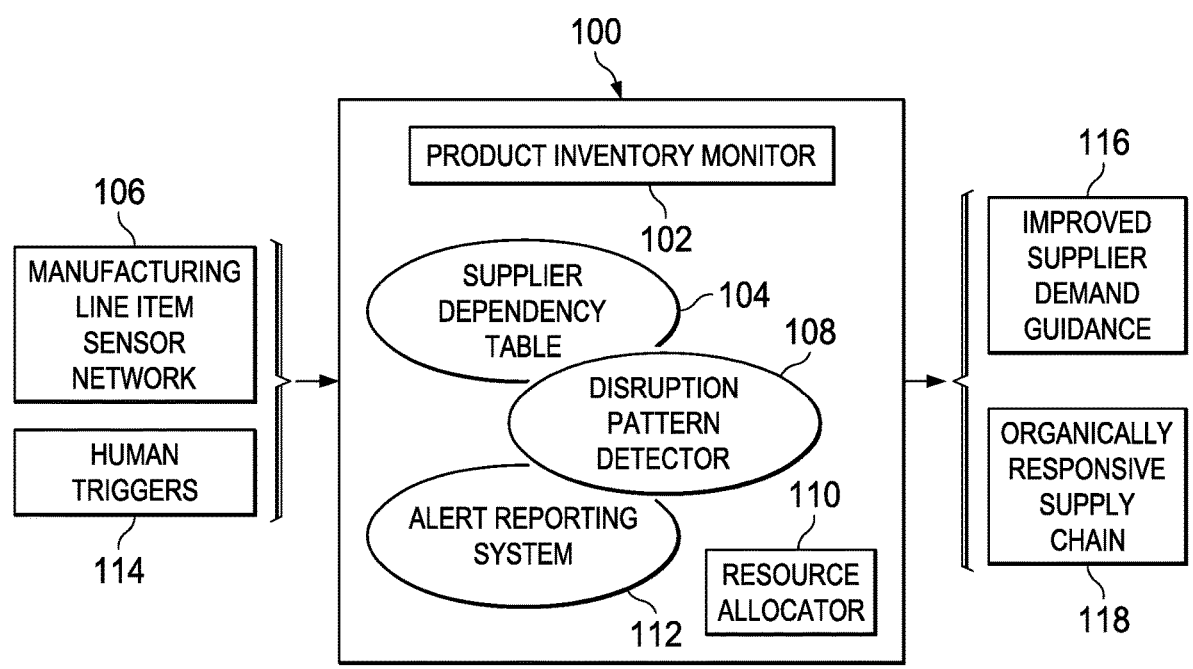
FIG. 1 is a diagram illustrating a manufacturing materiel management system, in accordance with an illustrative embodiment.

The illustrative embodiments recognize and take into account that disruptions in a manufacturing environment may result in disruptive, enterprise-wide ripple effects. Due to the realities of managing the supply chain, delays in inventory ordering, shipping, and delivery can occur. Accordingly, momentum in the supply chain may manifest, especially during disruptions. When large scale interruptions occur, people must notice and think about what potentially could be happening and how to adjust supplier levels. Thus, the illustrative embodiments also recognize and take into effect that current inventory and manufacturing management systems cannot handle disruption events and their ripple effects.

As used herein, the term "disruption event" is defined as an event in which manufacture of an object is disrupted or delayed as a result of loss of a resource, loss of a part, a shortage of human resources (such as manufacturing personnel), or other non-supply chain disruptive events. As used herein, the term "major disruption" refers to a disruption in a manufacturing environment which affects at least two other, different and significant aspects of the manufacturing endeavor, and further includes at least one dependent effect caused by the disruption.

As used herein, the term "human resource" disruption refers to disruptions caused by a lack of desirable human resources as a result of any cause. For example, a strike may cause an insufficient number of personnel to be available to construct an aircraft. In another example, insufficient qualified personnel may be available for hire, which causes an insufficient number of personnel to be available to complete manufacturing of an object. Other examples are possible.

As used herein, the term "non-supply chain" disruption refers to disruptions caused by events which are not directly tied to the supply chain used in supporting a manufacturing enterprise. As used herein, the term "supply chain" is defined as a system of materiel, components, or parts involved in manufacturing a product from beginning to end of the manufacturing process.

For example, a major disruption in an aircraft manufacturing environment may be the loss of a fuselage to be used to build an aircraft when the loss is caused by a third party. At least two other different and significant aspects of the manufacturing endeavor occur, such as disruption of the manufacturing line and idleness of personnel who would have worked on that fuselage had it been delivered. Additionally, at least one dependent effect would occur, such as disruptions in both inventory levels and the physical location of inventory items used in manufacturing. Usually, disruptions also ripple to vendors and other aspects of the company managing the manufacturing endeavor. Examples of events that my cause major disruptions include long term power disruption, supply delivery accidents caused by third parties, storm disruptions, and potentially many other events.

The illustrative embodiments provide for a learning disruption event handler. The learning disruption event handler acts as a learning inventory management supervisory system that monitors both manufacturing activities and inventory levels and then learns to proactively reallocate resources based on contextual awareness. The illustrative embodiments described herein take into account relationships of inventory dependencies and cascading challenges that occur when disruption events transpire. The illustrative embodiments contemplate using and building upon systems such as those described in our earlier work described in U.S. Pat. Nos. 7,769,643 and 8,700,499.

The illustrative embodiments may manage the inventory of an entire ecosystem of a manufacturing environment, including both the enterprise and its vendors. Managing the inventory level of the entire ecosystem results in reduced inventory and supply chain anticipation. By using pattern-based triggers, the illustrative embodiments automatically anticipate what potentially could be happening and how to adjust supplier levels.

The illustrative embodiments provide rule-based artificial intelligence systems which leverage big data analytics. For example, the illustrative embodiments may look at systemic effects of disruption across supply chain. The illustrative embodiments provide for "Internet of Things" sensing, including a system of systems approach to determine event parameters, impact, and scope. The illustrative embodiments provide for machine learning for disruption patterns and outcomes. The illustrative embodiments provide for a supplier dependency table which describes how a disruption will affect supplier schedules. The illustrative embodiments provide for a disruption pattern detector. The illustrative embodiments provide for an alert reporting system which notifies an external supply chain of disruption and anticipated duration. The illustrative embodiments may recommend alternative internal tasks depending on duration. The illustrative embodiments may recommend maintenance to be performed in lieu of manufacturing as a result of the disruption event. The illustrative embodiments may initiate training or certification opportunities to capitalize on personnel time which would otherwise be idle. The illustrative embodiments may proactively begin reallocating resources for optimization when a disruption event occurs. The illustrative embodiments may update and modify a manufacturing work flow system that manages parts, plans, tools, tasks, people, and associated drawings according to new resource requirements and allocation.

Thus, the illustrative embodiments may provide for a manufacturing materiel management system. The manufacturing materiel management system may include a product inventory monitor including at least one processor having a memory and a communications link. The manufacturing materiel management system may also include an at least one of a minimum-maximum item matrix and an item supplier dependency matrix. The manufacturing materiel management system may also include a manufacturing line item sensor network coupled to the product inventory monitor and configured to monitor in real-time inventory levels of a plurality of components, sub-assemblies, and assemblies in the product inventory. The manufacturing materiel management system may also include a disruption pattern detector in communication with the manufacturing line item sensor network, and configured to detect normal and abnormal inventory turns, and to generate therefrom normal and disruption patterns; and a resource allocator in communication with the product inventory monitor, the manufacturing line item sensor network, and the disruption pattern detector, and configured to monitor the normal and disruption patterns. The illustrative embodiments may then generate: (a) one or more of line resource plan allocation and reallocation parameter, and (b) if a disruption pattern is detected, at least one priority disruption parameter that defines an adjusted minimum-maximum item matrix and an adjustment alert.

The illustrative embodiments may confer a technical advantage and allow an enterprise to monitor its manufacturing progress through the build cycle with more confidence. The illustrative embodiments may safeguard an enterprise from carrying too much inventory and dynamically adjusting the labor, tools, and work packages. For example, using the illustrative embodiments, a lack of fuselages that affects all sub components in a ripple effect may result in surplus labor and resources which can be immediately, dynamically reallocated to other areas needing them, to avoid loss of time with respect to those areas. The illustrative embodiments can assist an enterprise in coordinating with vendors to minimize ripple-effect disruptions to the vendors, disruptions that can cause cascading challenges inside the enterprise and externally with suppliers.

The illustrative embodiments may concurrently manage groups of parts in multiple manufacturing facilities. The illustrative embodiments may also help prevent a cascade of shortages and overages for time, parts, and human resources. The illustrative embodiments may manage effectivities, which are the effects on planned updates, changes, and opportunities for the manufacturing endeavor.

The following is an example of an effectivity. Aircraft may have tail model numbers, representing different models of aircraft. Say, for example, tail models 301-330 for a block of planes with a particular specification of parts may have an inconsistency. When the inconsistency is detected, an update to manufacturing procedures and inventory may be desirable. In addition to the update, the illustrative embodiments may take into account the effectivity and retroactively update earlier blocks of tail models.

As described above, the illustrative embodiments allow for downstream management of a manufacturing endeavor after a disruption of a manufacturing system. The illustrative embodiments may thus minimize the negative effects on money, time, inventory, personnel, and vendor relationships when a disruption event occurs.

FIG. 1 is a diagram illustrating a manufacturing materiel management system, in accordance with an illustrative embodiment. Manufacturing materiel management system 100 may be implemented using a combination of a manufacturing assembly line and its supporting tools and machinery, as well as a data processing system, such as data processing system 700 of FIG. 7.

Manufacturing materiel management system 100 includes product inventory monitor 102 including at least one processor having a memory and a communications link. Manufacturing materiel management system 100 also includes supplier dependency table 104, which may include at least one of a minimum-maximum item matrix and an item supplier dependency matrix.

Manufacturing materiel management system 100 also includes manufacturing line item sensor network 106 coupled to product inventory monitor 102 and configured to monitor in real-time inventory levels of a plurality of components, sub-assemblies, and assemblies in the product inventory used for a manufacturing line for manufacturing an object. Manufacturing materiel management system 100 also includes disruption pattern detector 108 in communication with manufacturing line item sensor network 106, and configured to detect normal and abnormal inventory turns, and to generate therefrom normal and disruption patterns.

Manufacturing materiel management system 100 also includes resource allocator 110 in communication with product inventory monitor 102, manufacturing line item sensor network 106, and disruption pattern detector 108. Resource allocator 110 may be configured to monitor the normal and disruption patterns and to allocate resources to different projects when a disrupted pattern occurs.

Manufacturing materiel management system 100 also includes alert reporting system 112. Alert reporting system 112 may be used to issue alerts to personnel or to other aspects of manufacturing materiel management system 100.

These illustrative embodiments may be varied. For example, in addition to manufacturing line item sensor network 106, manufacturing materiel management system 100 may receive human triggers 114 as part of the input received into any of product inventory monitor 102, supplier dependency table 104, disruption pattern detector 108, resource allocator 110, or alert reporting system 112.

The effect of manufacturing materiel management system 100 may be an improved manufacturing system which more efficiently performs manufacturing of physical objects. For example, manufacturing materiel management system 100 may provide for improved supplier demand guidance 116. Manufacturing materiel management system 100 may also create or organize an organically responsive supply chain 118 which is resistant to disruption events.

Thus, an effect of manufacturing materiel management system 100 may be to more efficiently manufacture multiple aircraft in the face of a disruption event, including a major disruption event. Another effect of manufacturing materiel management system 100 may be to more efficiently order movement of the physical location of parts used in the manufacturing endeavor. Another effect of manufacturing materiel management system 100 may be the reallocation of human resources in the face of a disruption event, such as to training, maintenance of existing aircraft instead of manufacture, transfer to other facilities, or other adjustments. Many other variations are possible. Thus, the illustrative embodiments are not necessarily limited by the examples provided above.

Figure 2:
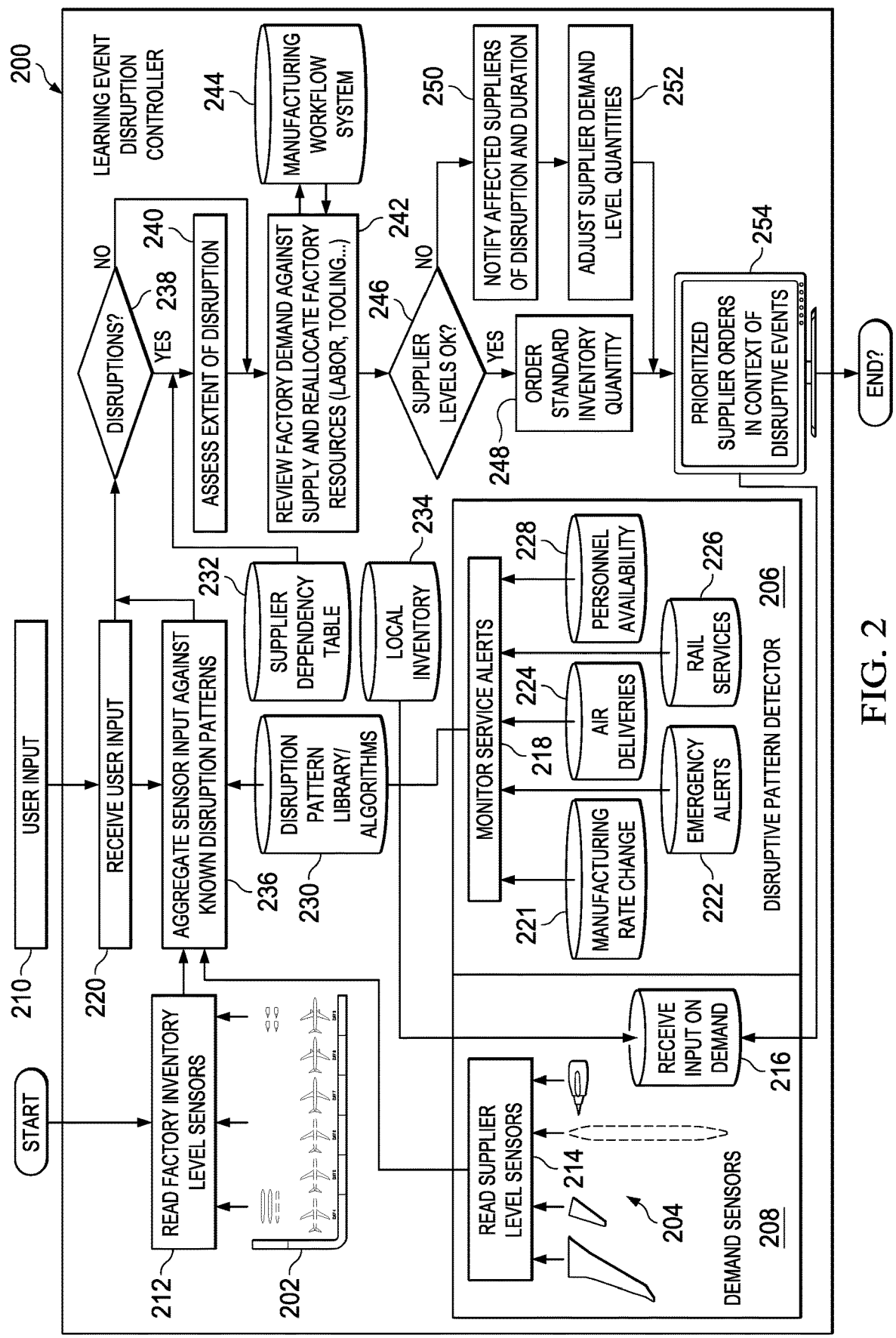
FIG. 2 is a diagram illustrating an operation of a disruption controller, in accordance with an illustrative embodiment.

FIG. 2 is a diagram illustrating an operation of a disruption controller, in accordance with an illustrative embodiment. An example of learning event disruption controller 200 may be manufacturing materiel management system 100 of FIG. 1. Learning event disruption controller 200 may be implemented using a data processing system, such as data processing system 700 of FIG. 7.

Learning event disruption controller 200 may receive input from many different sensors and/or human input. For example, learning event disruption controller 200 may use factory inventory level sensors 202, supplier level sensors 204, disruption pattern detector 206, demand sensors 208, user input 210, and other sources of input. Other sources of input may include disruption pattern library and algorithms 230, supplier dependency tables 232, and local inventory 234.

In use, learning event disruption controller 200 may read factory inventory level sensors (operation 212), read supplier level sensors (operation 214), receive input on demand (operation 216), monitor service alerts (operation 218), and receive user input (operation 220). Monitoring service alerts 218 may include monitoring manufacturing rate change 221, emergency alerts 222, air deliveries 224, rail services 226, and personnel availability 228. Learning event disruption controller 200 may also receive user input 220, read factory inventory level sensors 212, read supplier level sensor 214, and receive input on demand 216.

All of the above input is then aggregated as sensor input and then compared against known disruption patterns (operation 236). A determination is them made if a disruption has occurred (operation 238). In the case of a positive determination, learning event disruption controller 200 assesses the extent of the disruption (operation 240). In the case of a negative determination, or if no disruption has occurred, learning event disruption controller 200 may review factory demand against supply and reallocate factory resources accordingly (operation 242). As part of this operation, learning event disruption controller 200 may receive additional input from manufacturing work flow system 244.

Thereafter, a determination is made whether supplier levels are acceptable (operation 246). In the case of a positive determination, learning event disruption controller 200 may order the standard inventory quantities that had been originally planned (operation 248). In the case of a negative determination, learning event disruption controller 200 may notify affected suppliers of the disruption and its expected duration (operation 250). Learning event disruption controller 200 may also adjust supplier demand level quantities (operation 252).

Next, whether supplier levels were acceptable or not under operation 246, learning event disruption controller 200 may provide prioritized supplier orders in the context of disruption events (operation 254). These orders may be fed back into demand sensors 208, and thus the process may continually operate until monitoring is no longer desired. Otherwise, the method may terminate thereafter.

The illustrative embodiments described with respect to FIG. 2 represent only an example. The processes and devices described with respect to FIG. 2 may be varied, and thus do not necessarily limit the other illustrative embodiments described herein.

Figure 3:
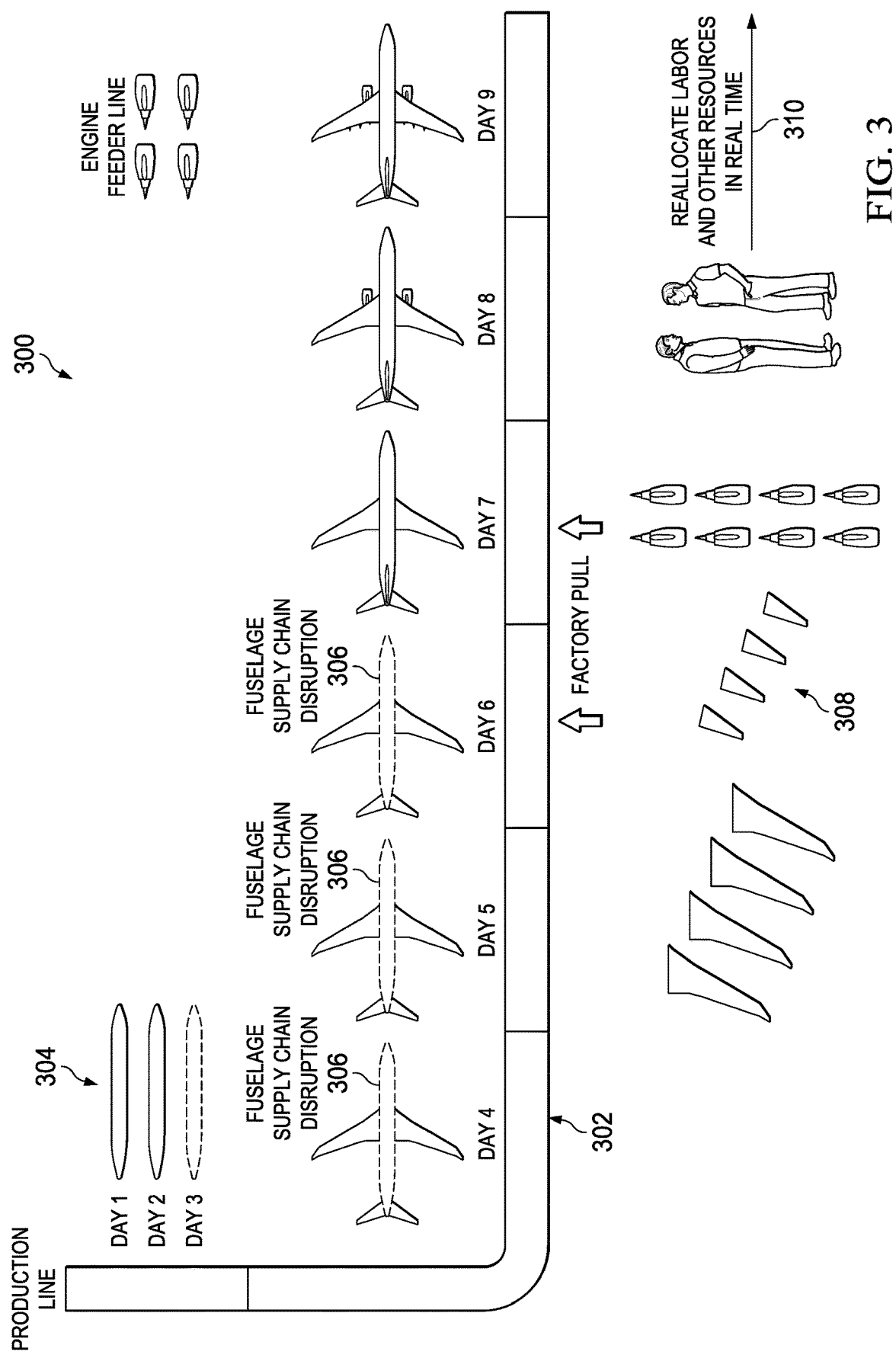
FIG. 3 is a diagram illustrating an example of a production line, in accordance with an illustrative embodiment.

FIG. 3 is a diagram illustrating an example of a production line, in accordance with an illustrative embodiment. Manufacturing environment 300 is an example of an environment which may be improved by the illustrative embodiments described with respect to FIG. 1, FIG. 2, and FIG. 1 through FIG. 6. Specifically, manufacturing environment 300 may be an aircraft manufacturing environment.

Manufacturing environment 300 may include production line 302, which is a production line of multiple aircraft. As shown in FIG. 3, on days one and two fuselages are provided as expected, as shown in area 304. However, also shown in area 304, on day three fuselages are not provided, representing a major disruption event. As a result, on days four, five, and six a fuselage supply chain disruption occurs, as shown in area 306, and as a result factory pull of parts 308 is also disrupted.

A manufacturing material management system, such as learning event disruption controller 200 of FIG. 2, may be used to reallocate labor and other resources in real time, as shown in area 310. As used herein "real time" action means taking action immediately after an event or an order such that reactions to an event take place nearly immediately after the event.

The illustrative embodiments described with respect to FIG. 3 represent only an example. The processes and devices described with respect to FIG. 3 may be varied, and thus do not necessarily limit the other illustrative embodiments described herein.

Figure 4:
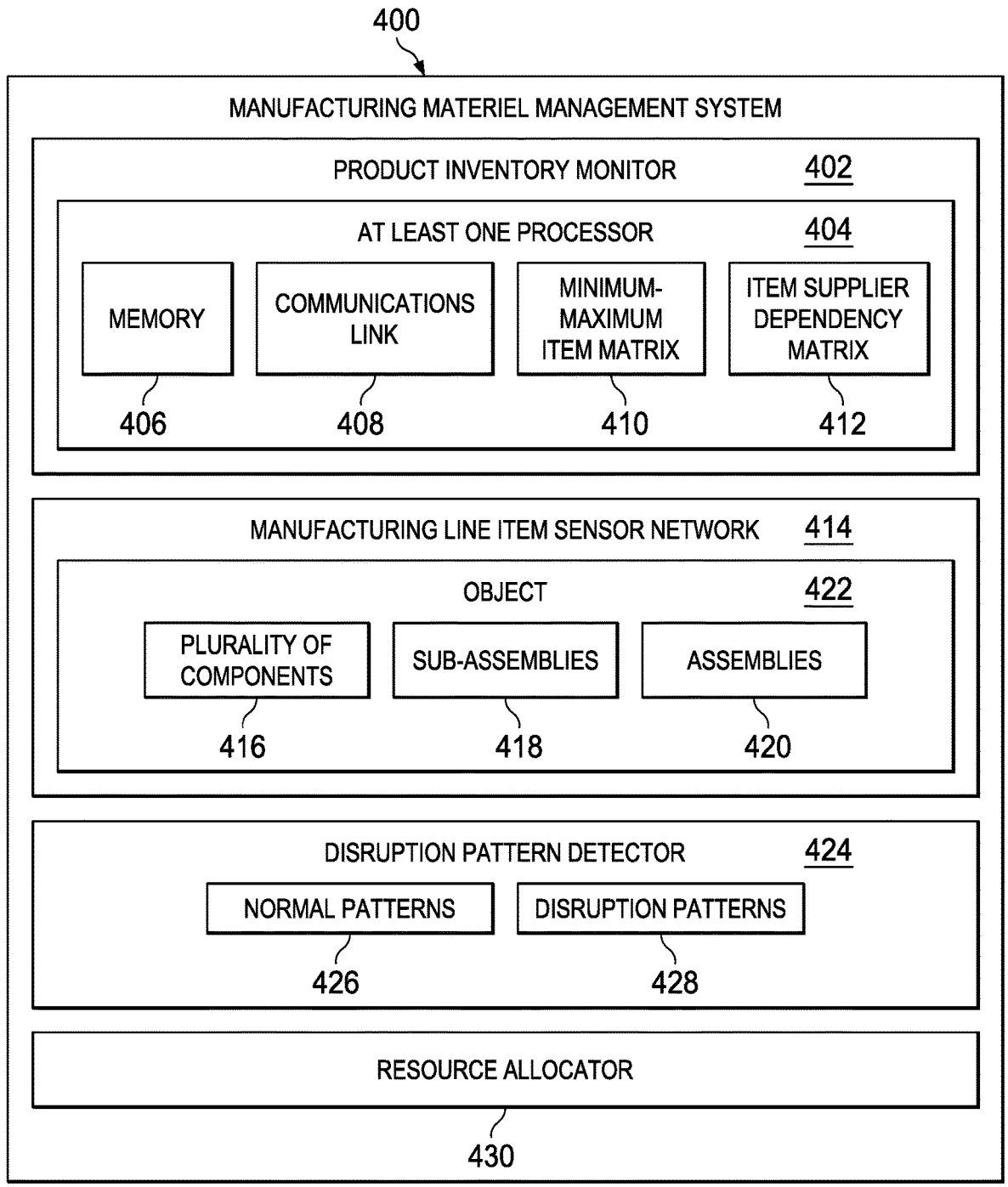
FIG. 4 is a block diagram illustrating a manufacturing materiel management system, in accordance with an illustrative embodiment.

FIG. 4 is a block diagram illustrating a manufacturing materiel management system, in accordance with an illustrative embodiment. Manufacturing materiel management system 400 is another variation of manufacturing materiel management system 100 of FIG. 1 and learning event disruption controller 200 of FIG. 2. Manufacturing materiel management system 400 may be used to manage manufacturing environment 300 of FIG. 3.

Manufacturing materiel management system 400 includes product inventory monitor 402, which includes at least one processor 404 having memory 406 and communications link 408, as well as at least one of a minimum-maximum item matrix 410 and an item supplier dependency matrix 412. These matrices may be implemented as databases.

Manufacturing materiel management system 400 also includes manufacturing line item sensor network 414 coupled to product inventory monitor 402. Manufacturing line item sensor network 414 may be configured to monitor in real-time inventory levels of a plurality of components 416, sub-assemblies 418, and assemblies 420 in the product inventory used for a manufacturing line for manufacturing object 422. As used herein, components are parts used to create a greater whole, such as object 422, which may be an aircraft for example. A sub-assembly as defined herein as a collection of components, but which itself part of a greater whole, particularly assemblies 420. As used herein an assembly is a collection of sub-assemblies or components that forms a significant part of an object, which may be an aircraft for example.

Manufacturing materiel management system 400 may also include disruption pattern detector 424. Disruption pattern detector 424 may be in communication with manufacturing line item sensor network 414. Disruption pattern detector 424 may be configured to detect normal and abnormal inventory turns, and to generate therefrom normal patterns 426 and disruption patterns 428.

Manufacturing materiel management system 400 may also include resource allocator 430. Resource allocator 430 may be in communication with product inventory monitor 402, manufacturing line item sensor network 414, and disruption pattern detector 424. Resource allocator 430 may be configured to monitor normal patterns 426 and disruption patterns 428 and to allocate resources to different projects when a disrupted pattern occurs.

Manufacturing materiel management system 400 may be varied. For example, manufacturing materiel management system 400 may further include a line resource plan allocation parameter configured to allocate resources from the manufacturing line when the disrupted pattern occurs. In another illustrative embodiment, for manufacturing materiel management system 400 the resource allocator is further configured with a priority disruption parameter that defines, after the disrupted pattern occurs and based on a type of the disrupted pattern, an adjusted minimum-maximum item matrix and an adjustment alert.

In yet another illustrative embodiment, the object comprises a commercial aircraft and the manufacturing line comprises an assembly line for manufacturing the commercial aircraft. In this case, the disruption event comprises a loss caused by a third party. Specifically, the loss may be loss of at least one of a major assembly, a sub-assembly, and a component to be used in the manufacturing line. In this case, the resource allocator is configured to allocate resources that would work on the at least one of the major assembly, the sub-assembly, and the component to at least one of: other sections of the manufacturing line and tasks other than the manufacturing line. The resources may be selected from the group consisting of: personnel, machines, tools, parts, assemblies, monuments, power, and raw resources.

The illustrative embodiments described with respect to FIG. 4 represent only an example. The processes and devices described with respect to FIG. 4 may be varied, and thus do not necessarily limit the other illustrative embodiments described herein.

Figure 5:
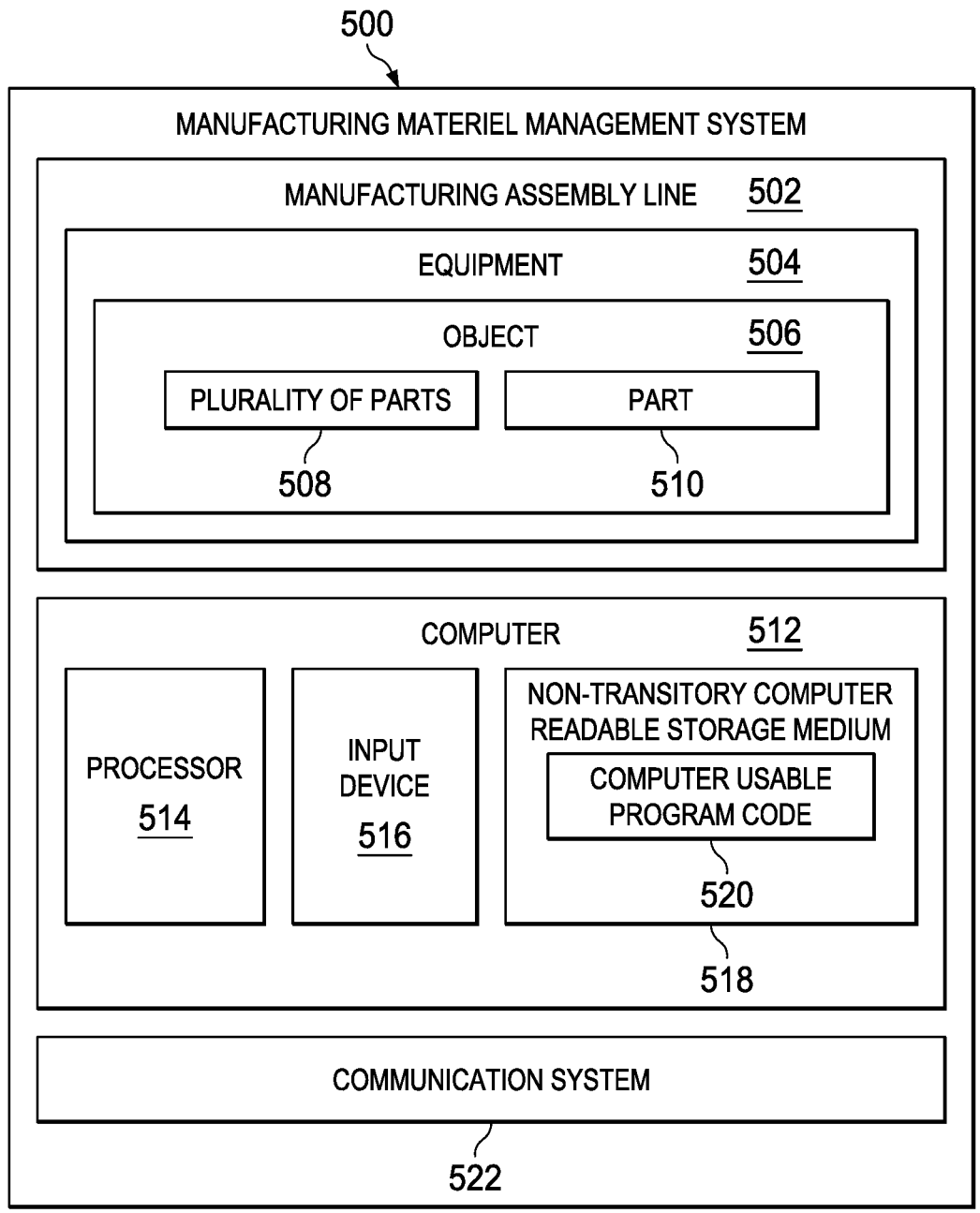
FIG. 5 is a block diagram illustrating another manufacturing materiel management system, in accordance with an illustrative embodiment.

FIG. 5 is a block diagram illustrating another manufacturing materiel management system, in accordance with an illustrative embodiment.

Manufacturing materiel management system 500 is another variation of manufacturing materiel management system 500 of FIG. 5, manufacturing materiel management system 100 of FIG. 1 and learning event disruption controller 200 of FIG. 2. Manufacturing materiel management system 400 of FIG. 4 may be used to manage manufacturing environment 300 of FIG. 3.

Manufacturing materiel management system 500 may include manufacturing assembly line 502, including equipment 504 usable to manufacture object 506 comprising plurality of parts 508, including part 510. Manufacturing materiel management system 500 also includes computer 512 including processor 514, input device 516, and non-transitory computer readable medium 518 in communication with processor 514. Non-transitory computer readable medium 518 may store computer usable program code 520 executable by processor 514 to perform functions.

These functions include monitoring input device 516 for input that indicates a disruption event, defined as an event in which manufacture of object 506 is disrupted as a result of loss of a resource or the part. These functions also include, responsive to receiving the input, calculate another project which may continue. These functions also include, responsive to receiving the input, calculate remaining resources which may be allocated to the another project. These functions also include generating a resource re-allocation plan which defines how remaining resources are to be re-allocated to the another project.

Manufacturing materiel management system 500 also includes communication system 522. Communication system 522 is in communication with computer 512 and is configured to communicate the re-allocation plan to a manager of manufacturing assembly line 502.

This illustrative embodiment may be varied. For example, computer usable program code 520 may use a contextual awareness to generate the resource re-allocation plan. The contextual awareness may be input to computer 512 selected from the group consisting of: minimum and maximum supply chain values for the plurality of points, a description of an environmental event that impacts the manufacturing assembly line, an item supplier dependency matrix that indicates dependencies between suppliers for different ones of the plurality of parts, and a duration of the event.

In another illustrative embodiment, manufacturing materiel management system 500 may also include an alert system configured to present an alert when the disruption occurs in any of the following: an external supply chain that is external to the manufacturing line, human resource limits (including personnel challenges such as employee strike or other disruptive events involving personnel), or other resource limits (including but not limited to electrical power outages, fuel shortages, material shortages, component shortages, and the like). In another illustrative embodiment, the another project may be manufacturing a different on the manufacturing assembly line. In still another illustrative embodiment, the another project comprises using the manufacturing assembly line to perform maintenance of an existing object. In yet another illustrative embodiment, the another project may be ceasing or reducing operation of the manufacturing assembly line and transferring the remaining resources to a different manufacturing facility at a different geographical location. In another illustrative embodiment, the another projects may be initiating training or retraining of personnel who work on the manufacturing assembly line.

As used herein, disrupted is defined as use of the manufacturing assembly line being stopped or slowed. Disrupted also contemplates a forced re-arrangement of components, sub-assemblies, or assemblies on manufacturing assembly line 502. As used herein, the part may be an assembly of sub-components.

In another illustrative embodiment, the input may be sensor output from a sensor disposed to monitor the manufacturing assembly line. However, the input may be at least one of user input and data received from a third party. In still an alternative illustrative embodiment, the computer usable program code is configured to be executable to perform machine learning to analyze disruption patterns and outcomes.

In another illustrative embodiment, communication system 522 may be configured to notify, responsive to receiving the input, a third party vendor of the event. In this case, communication system 522 may be further configured to direct, as part of the re-allocation plan, the third party vendor to change production of the part or of sub-components. Still further, the third party vendor may be directed to perform an action with respect to the part or the sub-components, the action selected from the group consisting of: increasing production, decreasing production, stopping production, and starting production of a different part or sub-component.

The illustrative embodiments described with respect to FIG. 5 represent only an example. The processes and devices described with respect to FIG. 5 may be varied, and thus do not necessarily limit the other illustrative embodiments described herein.

Figure 6:
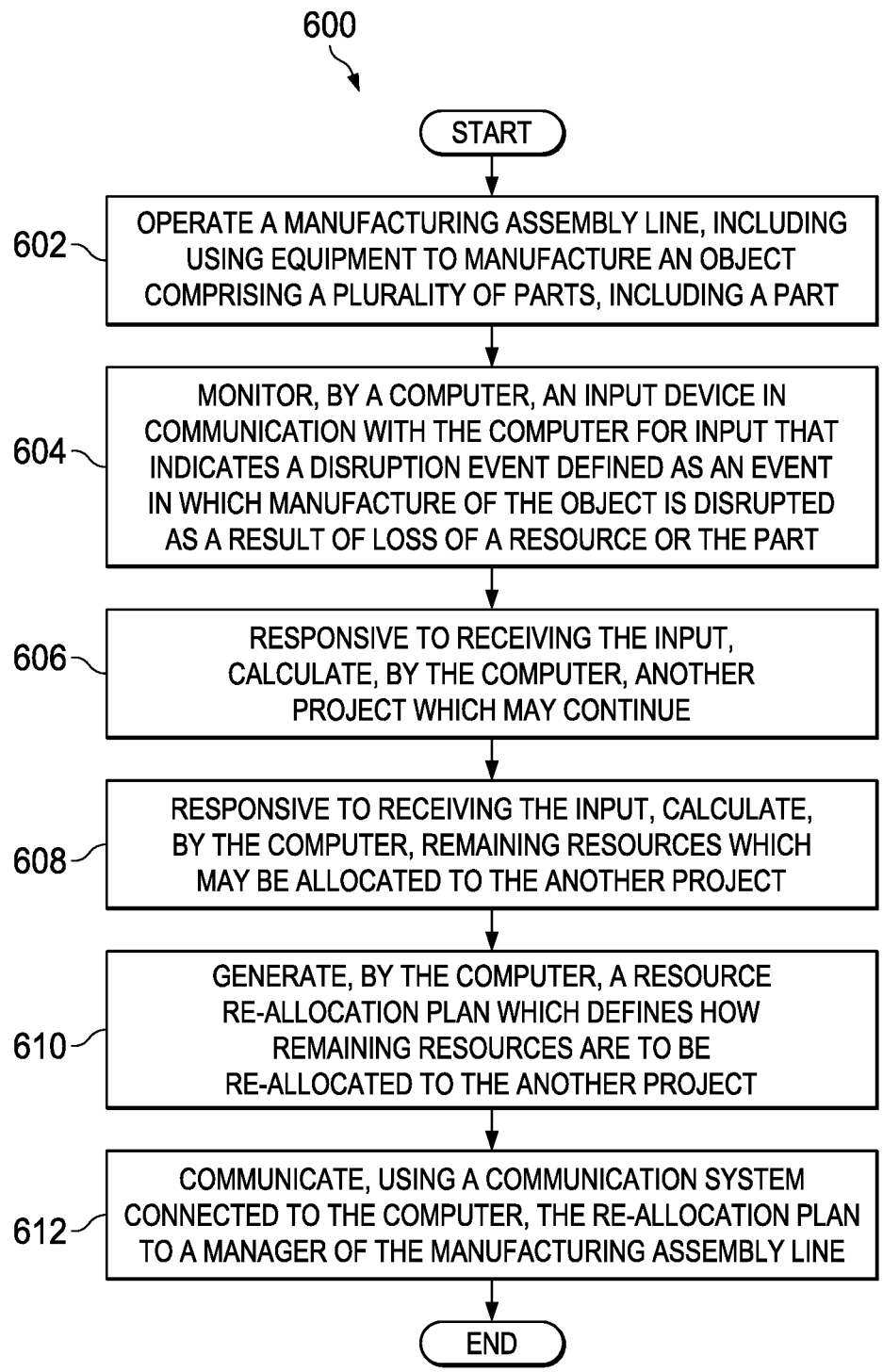
FIG. 6 is a flowchart of a method for manufacturing, in accordance with an illustrative embodiment.

FIG. 6 is a flowchart of a method for manufacturing, in accordance with an illustrative embodiment. Method 600 may be implemented by manufacturing materiel management system 100 of FIG. 1, learning event disruption controller 200 of FIG. 2, manufacturing materiel management system 400 of FIG. 4, and manufacturing materiel management system 500 of FIG. 5. Method 600 may be used to manage manufacturing environment 300 of FIG. 3. Method 600 may be implemented by a data processing system, such as data processing system 700 of FIG. 7.

Method 600 may begin by operating a manufacturing assembly line, including using equipment to manufacture an object comprising a plurality of parts, including a part (operation 602). Next, method 600 may include monitoring, by a computer, an input device in communication with the computer for input that indicates a disruption event defined as an event in which manufacture of the object is disrupted as a result of loss of a resource or the part (operation 604).

Method 600 also includes, responsive to receiving the input, calculating, by the computer, another project which may continue (operation 606). Method 600 also includes, responsive to receiving the input, calculating, by the computer, remaining resources which may be allocated to the another project (608).

Method 600 also includes generating, by the computer, a resource re-allocation plan which defines how remaining resources are to be re-allocated to the another project (operation 610). Method 600 also includes communicating, using a communication system connected to the computer, the re-allocation plan to a manager of the manufacturing assembly line (operation 612). The method may terminate thereafter.

The illustrative embodiments described with respect to FIG. 6 represent only an example. The processes and devices described with respect to FIG. 6 may be varied, and thus do not necessarily limit the other illustrative embodiments described herein.

Figure 7:
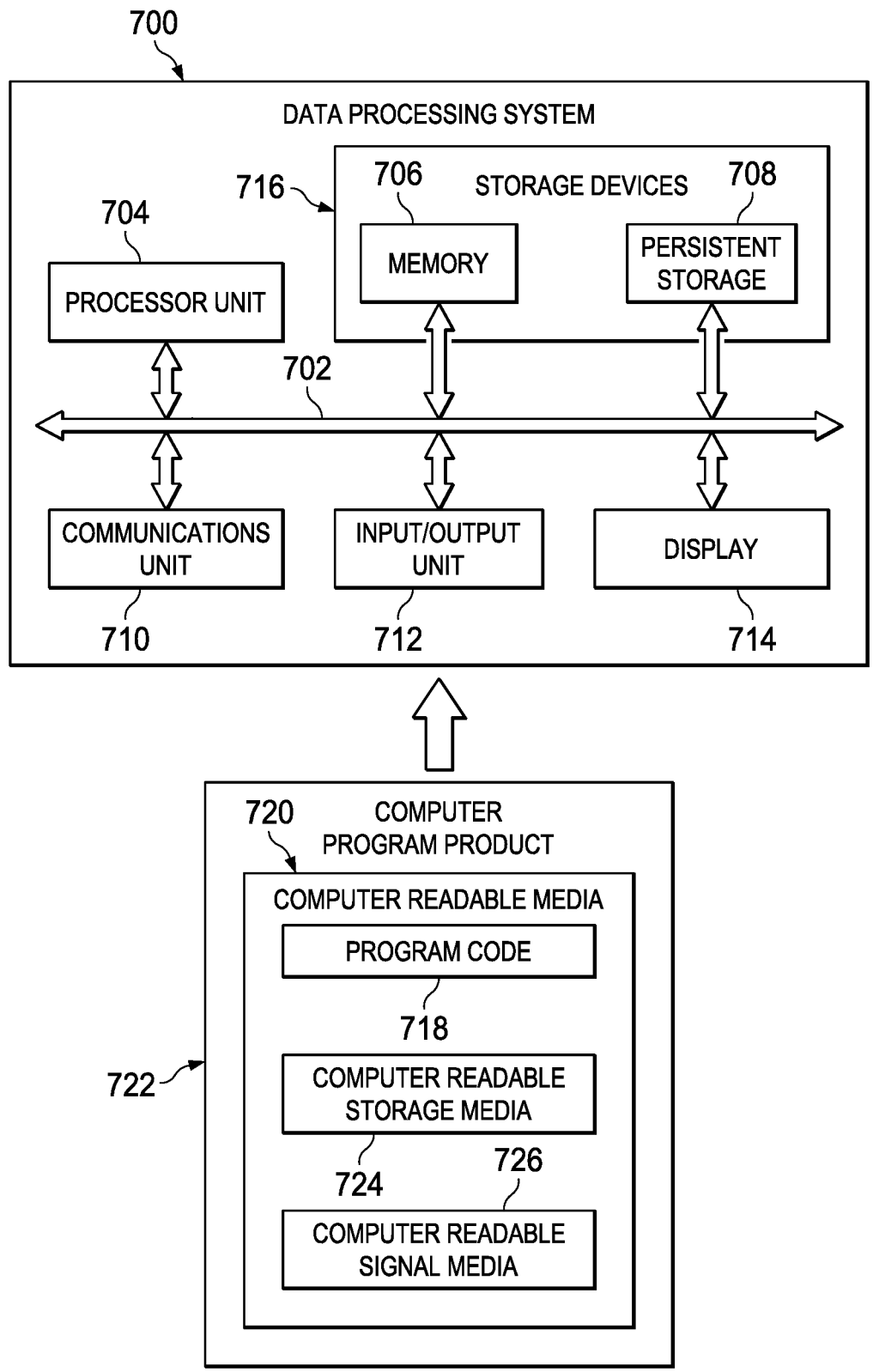
FIG. 7 illustrates a data processing system, in accordance with an illustrative embodiment.

Turning now to FIG. 7, an illustration of a data processing system is depicted in accordance with an illustrative embodiment. Data processing system 700 in FIG. 7 is an example of a data processing system that may be used to implement the illustrative embodiments, such as the manufacturing materiel management systems described with respect to FIG. 1 through FIG. 6. In this illustrative example, data processing system 700 includes communications fabric 702, which provides communications between processor unit 704, memory 706, persistent storage 708, communications unit 710, input/output (I/O) unit 712, and display 1014.

Processor unit 704 serves to execute instructions for software that may be loaded into memory 706. This software may be an associative memory, content addressable memory, or software for implementing the processes described elsewhere herein. Processor unit 704 may be a number of processors, a multiprocessor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multiprocessor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters. The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A manufacturing materiel management system, comprising:
    a product inventory monitor including at least one processor having a memory and a communications link, and at least one of a minimum-maximum item matrix and an item supplier dependency matrix;
    a manufacturing line item sensor network coupled to the product inventory monitor and configured to monitor in real-time inventory levels of a plurality of components, sub-assemblies, and assemblies in the product inventory used for a manufacturing line for manufacturing an object;
    a disruption pattern detector in communication with the manufacturing line item sensor network, and configured to detect normal and abnormal inventory turns, and to generate therefrom normal and disruption patterns; and
    a resource allocator in communication with the product inventory monitor, the manufacturing line item sensor network, and the disruption pattern detector, and configured to monitor the normal and disruption patterns and to allocate resources to different projects when a disrupted pattern occurs.

2. The manufacturing materiel management system of claim 1, further comprising:
   a line resource plan allocation parameter configured to allocate resources from the manufacturing line when the disrupted pattern occurs.

3. The manufacturing materiel management system of claim 1, wherein the resource allocator is further configured with a priority disruption parameter that defines, after the disrupted pattern occurs and based on a type of the disrupted pattern, an adjusted minimum-maximum item matrix and an adjustment alert.

4. The manufacturing materiel management system of claim 1, wherein the object comprises a commercial aircraft and the manufacturing line comprises an assembly line for manufacturing the commercial aircraft.

5. The manufacturing materiel management system of claim 4, wherein the disruption pattern detector is further configured to detect a disruption event comprising a loss caused by a third party.

6. The manufacturing materiel management system of claim 5, wherein the loss comprises loss of at least one of a major assembly, a sub-assembly, and a component to be used in the manufacturing line.

7. The manufacturing materiel management system of claim 6, wherein the resource allocator is configured to allocate resources that would work on the at least one of the major assembly, the sub-assembly, and the component to at least one of: other sections of the manufacturing line and tasks other than the manufacturing line.

8. The manufacturing materiel management system of claim 7, wherein the resources are selected from the group consisting of: personnel, machines, tools, parts, assemblies, monuments, power, and raw resources.

9. The manufacturing materiel management system of claim 1, further comprising:
   an alert system configured to present an alert when any one of the following events occur:
   the disruption occurs in an external supply chain that is external to the manufacturing line;
   the disruption occurs due to a limit in human resources; or
   the disruption occurs due to a limit in a resource.

10. The manufacturing materiel management system of claim 9, wherein the alert system notifies an external supply chain of disruption and anticipated duration.

11. The manufacturing materiel management system of claim 1, wherein allocating resources to different projects comprises using the manufacturing line to perform maintenance of an existing object.

12. The manufacturing materiel management system of claim 1, wherein allocating resources to different projects comprises ceasing or reducing operation of the manufacturing line and transferring the remaining resources to a different manufacturing facility at a different geographical location.

13. The manufacturing materiel management system of claim 1, wherein allocating resources to different projects comprises initiating training or retraining of personnel who work on the manufacturing assembly line.

14. The manufacturing materiel management system of claim 1, wherein the item supplier dependency matrix indicates dependencies between suppliers for different ones of a plurality of parts.

15. The manufacturing materiel management system of claim 14, wherein the supplier dependency table describes how a disruption will affect supplier schedules.

16. The manufacturing materiel management system of claim 1, wherein the minimum-maximum item matrix and item supplier dependency matrix are part of a supplier dependency table.

17. The manufacturing materiel management system of claim 1, further comprising a disruption pattern library.

18. The manufacturing materiel management system of claim 1, further comprising factory inventory level sensors.

19. The manufacturing materiel management system of claim 1, further comprising supplier level sensors.

20. The manufacturing materiel management system of claim 1, further comprising demand sensors.

* * * * *